(12) United States Patent
Bauer et al.

(10) Patent No.: US 8,330,902 B2
(45) Date of Patent: Dec. 11, 2012

(54) DISPLAY CELL WITH COMPARTMENTALIZED LIQUID-CRYSTAL LAYER, METHOD FOR ITS PRODUCTION AND A LIQUID-CRYSTAL MATERIAL-CONTAINING MIXTURE SUITABLE THEREFOR

(75) Inventors: Monika Bauer, Koenigs Wusterhausen (DE); Frank Kuschel, Halle (DE); Joachim Mueller, Berlin (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 340 days.

(21) Appl. No.: 12/668,416

(22) PCT Filed: Jul. 8, 2008

(86) PCT No.: PCT/EP2008/058837
§ 371 (c)(1),
(2), (4) Date: Jan. 25, 2010

(87) PCT Pub. No.: WO2009/007363
PCT Pub. Date: Jan. 15, 2009

(65) Prior Publication Data
US 2010/0195025 A1 Aug. 5, 2010

(30) Foreign Application Priority Data
Jul. 10, 2007 (DE) .......................... 10 2007 032 169

(51) Int. Cl.
*G02F 1/1333* (2006.01)
(52) U.S. Cl. ................ 349/89; 349/56; 349/84; 349/86; 349/88; 349/92
(58) Field of Classification Search .................... 349/56, 349/84, 86, 88, 89, 92
See application file for complete search history.

(56) References Cited

U.S. PATENT DOCUMENTS

| | | | |
|---|---|---|---|
| 5,473,450 A | 12/1995 | Yamada et al. | |
| 5,844,643 A | 12/1998 | Onishi et al. | |
| 6,061,107 A | 5/2000 | Yang et al. | |
| 6,130,734 A * | 10/2000 | Fujita et al. | 349/97 |
| 6,532,046 B1 | 3/2003 | Yamashita et al. | |
| 6,788,368 B2 | 9/2004 | Takahashi et al. | |
| 6,864,931 B1 | 3/2005 | Kumar et al. | |
| 2004/0119911 A1 | 6/2004 | Ooae et al. | |
| 2004/0233351 A1 * | 11/2004 | Lazarev | 349/96 |

FOREIGN PATENT DOCUMENTS

| | | |
|---|---|---|
| DE | 60101196 T2 | 4/2002 |
| EP | 540353 B1 | 5/1993 |
| EP | 1703315 A1 | 9/2009 |
| WO | 87/01822 | 3/1987 |
| WO | 2005/072304 A2 | 8/2005 |

OTHER PUBLICATIONS

Hopee C E et al: Polymer-dispersed liquid crystals based on polystyrene and EBBA: Analysis of phase diagrams and morphologies generated; Macromolecular Chemistry and Physics; Wiley-VCH Verlag DE, May 7, 2003; vol. 204, No. 7; pp. 926-935 ; see international search report.
Kyu T et al: Thermal induced phase separation in a mixture of functional poly(methyl methacrylate) and low-molar-mass liquid crystals; Chapter 13 (pp. 201-215) of book Isayev A I et al—Liquid Crystalline Polymer Systems—American Chemical Society ISBN 978-0-8412-3408-6; 1996; see international search report.
Kuschel F et al: Oriented LC-microdroplets in polymer matrices: prospects and applications; Polymers and Adhesives in Microelectronics and Photonics; 2001; First International IEEE Conrference, Oct. 21-24, 2001; pp. 295-299; see international search report.
Wang et al: Phase Separation of Polymer Dispersed Liquid Crystals on a Chemically Patterned Substrate; Langmuir 23 (14) 7411-7415 (2007).
Shiyanovskaya et al.:Substrate Free Cholesteric Liquid Crystal Displays; Kent Displays; Inc. 32-34 (2006); ISSN10831213/00/2006-0032.
Chen et al.: Thermoplastic polymer-dispersed liquid crystals prepared from solvent induced phase separation with predictions using solubility parameters; Liquid Crystals, 34 (12) 1349-1356 (2007).
Zheng et al.: Improvement in morphological and electro-optical properties of polymer-dispersed liquid crystal grating using a highly fluorine-substituted acrylate monomer; Liquid Crystals, 35(7), 885-893 (2008).
Shiyanovskaya et al.:Substrate Free Cholesteric Liquid Crystal Displays; J. of the SID 16/1, 113-115 (2007).
Shiu et al.: Recent Results of Flexible Cholesteric Liquid-Crystal Displays; J. of the SID 17/10, 811-819 (2009).

* cited by examiner

*Primary Examiner* — Jennifer Doan
(74) *Attorney, Agent, or Firm* — Gudrun E. Huckett

(57) ABSTRACT

The invention relates to a display cell, comprising two transparent, equidistant plates, wherein the gap between the plates is filled with a liquid-crystal material-containing layer, characterized in that the liquid-crystal material-containing layer is inhomogeneous and anisotropic, wherein it has a first region made up of compartments, which comprise entirely, substantially or mainly liquid-crystal material, and a second, coherent region which comprises entirely, substantially or mainly an organic polymer material and surrounds the compartments made of liquid-crystal material. In addition, the invention relates to a liquid-crystal material-containing mixture which can be used to produce the layer between the plates, and to a method for producing the display cell.

25 Claims, No Drawings

US 8,330,902 B2

DISPLAY CELL WITH COMPARTMENTALIZED LIQUID-CRYSTAL LAYER, METHOD FOR ITS PRODUCTION AND A LIQUID-CRYSTAL MATERIAL-CONTAINING MIXTURE SUITABLE THEREFOR

BACKGROUND OF THE INVENTION

The present invention concerns a method for producing layers that are generated from mixtures that contain a liquid crystal material and are homogenous and isotropic at suitable temperatures and, after appropriate cooling, have a coherent polymer structure with isolated liquid crystal compartments. These layers are suitable for use in electro-optical displays.

Electro-optical display cells are comprised in general of two panes or plates that are spaced apart from one another by a few μm of which at least one plate is light-transmissive. The plates are pretreated on their inner side in a suitable way, for example, coated with ITO (indium tin oxide), in order to provide electrical conductivity. Between the plates there is a liquid crystal layer. In order to secure the plates so as to be equidistantly spaced apart from one another, spacers are usually employed that, for example, are comprised of balls produced from mineral or organic material or rods or walls produced by UV light. However, the non-uniform distribution, the yielding action when exposed to external pressure, and the unsatisfactory mechanical stability have disadvantageous effects on the display function.

Known in the art are polymer-dispersed liquid crystals (PDLC) that are comprised of micro-heterogeneous liquid crystal polymer composites and are used as electro-optical light switches. Polymer components contained therein are in general incoherent. In order to achieve the desired scattering conditions, the dimensions of the LC regions must be matched accordingly, for example, for visible light must have a diameter of approximately 0.3 to 3 μm. Such polymer-dispersed liquid crystals are disclosed, for example, in WO 87/01822, EP 540353 B1, and WO 2005/072304. Inasmuch as they fulfill further required conditions, they can be switched with the aid of an electric field between a light-scattering and a transparent state. Light scattering, in the context of the present invention, is an effect that should be prevented as much as possible.

In U.S. 2004/0119911 A1 a liquid crystal display with thermal-optical properties is disclosed. The size of the liquid crystal droplets is not indicated therein.

It is an object of the present invention to provide liquid crystal layers for display cells whose intrinsic properties lead to an improved mechanical stability of the display cells. Moreover, it is an object of the present invention to provide liquid crystal layers whose optical properties can be influenced region-selectively without having to fear a later intermixing of the selectively influenced regions with other regions. In a preferred embodiment of the invention, the object of providing display cells that, despite high mechanical stability, are bendable without causing destruction of the region-selective controllability is to be solved furthermore.

SUMMARY OF THE INVENTION

This object is solved according to the invention in that the display cell is filled with an inhomogeneous and anisotropic material, i.e., a liquid crystal polymer composite, that in the cell is present as a layer with different regions that have different properties. A first region of liquid crystal material is divided into individual compartments. A second region of an organic polymer material is coherent in that it encloses the compartments of liquid crystal material. In this connection, the liquid crystal compartments may be comprised entirely, substantially, or mainly of a liquid crystal material while the polymers that surround these compartments are entirely, substantially, or mainly comprised of an organic polymer material. In this connection, "substantially" is to be understood such that the proportion of other materials than the material that is to be present substantially is so minimal that the properties of the relevant material are substantially unchanged, i.e., are still predominant and are not affected by the presence of the other material or materials. "Mainly" is to be understood in the context of the present invention such that the material that is "mainly" present is present to more than 50% by weight of the total material when a single further material is present while its proportion, in case that at least two further materials are present, must be greater than that of each individual one of the other materials and preferably surpasses also 50% by weight of the total material.

The compartments of the first region have preferably a lateral expansion between 10 to 100 μm wherein the rule shall be that at least 30%, preferably at least 50%, of the compartments and often an even greater proportion or even all of the compartments should have a diameter of at least 20 μm. The diameter of the compartments perpendicular to the layer are within a similar magnitude, should the layer even allow for this. Since the liquid crystal layers often only have a thickness of approximately 2-10 μm, the compartments of the first region (liquid crystal compartments) in general extend completely through the layer and therefore from one wall to the other wall of the display cell, which is desirable. The coherent polymer material region is in general structured such that the liquid crystal compartments through this region have a spacing of at least 1 pm and in general of approximately 1 to 20 μm relative to one another.

With the structure of the display according to the invention, optical properties of the liquid crystal material can be selectively controlled, for example, in selected liquid crystal compartments, and also the liquid crystal layers can be mechanically stabilized as a whole. The liquid crystal layers according to the invention therefore may be used advantageously in electro-optical displays.

A method for producing display cells that are filled with the afore defined layers comprises providing a mixture that contains a liquid crystal material as well as a suitable polymer material. This mixture is heated past the clearing point of the liquid crystal material so that it becomes homogenous and isotropic. In this state it can be filled into the space between the panes or plates of a display cell. Upon subsequent cooling, the aforementioned mixture will separate into first and second regions.

As an organic polymer material for the present invention, organic polymers are generally suitable that are capable of performing a support function for the display to be produced. In this connection, in accordance with a first embodiment of the invention, organic polymers (A) can be used that enable the manufacture of liquid crystal compartments that are enclosed by rigid walls. Suitable in this connection are in particular organic polymers with glass transition temperatures ($T_g$ of at least 60° C., preferably of at least 80° C., and especially preferred of at least 100° C. The higher the glass transition temperature of the employed polymers (A), the higher the obtainable mechanical stability. The polymer material must be capable of forming with liquid crystal materials above their clearing point homogenous, isotropic mixed melts, namely either at least in the presence of solvents or in the absence of a solvent. From the homogenous, isotropic mixed melts, after removal of a possibly employed solvent and after suitable cooling, the described coherent polymer structures are to be generated.

It is a preferred, if not always necessary, feature of the polymers (A) that their glass transition temperatures are more than 20 K above the clearing points of the employed liquid crystal materials, respectively. Particularly beneficial are temperature differences in the range of 25-100 K.

The chemical composition of the aforementioned polymers (A) is in principle not limited as long as the aforementioned conditions are fulfilled. Beneficial are polymers whose molecular volume is not too small. Polyacrylates and polymethacrylates (referred to in the following as a group also as poly(meth) acrylates) are especially suitable in this connection, and among them particularly polyalkyl and polycycloalykl acrylates and methacrylates with at least 2 carbon atoms in the alcohol portion of the ester. Methacrylates with a branched alkyl residue and/or at least one cyclic structure in the alcohol portion, that optionally may be condensed and/or bridged, are beneficial. As cyclic structures substituted or unsubstituted alicyclic structural units such as cyclohexyl are beneficial, as bridged cyclic structures, for example, bicyclodecyl (decahydronaphthyl) or isobornyl. Also, in the alcohol portion of the monomer units several cycloalkyl units may be present. These cyclic structures may form directly the alcohol portion of the ester or may comprise further alkyl(ene) residues, such as t-butyl, as terminal or intermediately positioned groups. An example of such an alcohol portion is 4-cyclohexyl cyclohexyl residue. As condensed cyclic structures, partially or completely hydrogenated naphthyl residues are suitable, for example. Also, aryl or phenyl may be a component of the alcohol portion. Polymethylmethacrylate that is used often for PDLCs is however not suitable: even though it has a satisfactorily high glass transition temperature, it generally does not separate with formation of coherent structures of liquid crystal materials but forms incoherent grainy polymer precipitations. The aforementioned polymers (A) may be used as homopolymers or copolymers, in pure form or in mixed form.

In a second embodiment of the invention the second regions are comprised of polymer material, partially of the aforementioned relatively rigid regions as well as further softer regions. For this purpose, in addition to the polymers (A) further organic polymer materials are used that adjacent to or around groups of compartments with a rigid wall may enable the formation of liquid crystal compartments that are enclosed by soft walls. After their intracellular precipitation adjacent to or around the groups of liquid crystal material compartments with rigid walls of polymer material (A), these organic polymers (B) impart to the layer an improved flexibility, wherein, upon bending of a filled display cell that, for example, has flexible panes, a confluence of liquid crystal material from a larger number of compartments is prevented in case of possible fractures or tears in the rigid regions because the soft regions will be able to yield to the bending action without breaking or tearing (fold hinge effect). The polymers (B) should have glass transition temperatures that are below the glass transition temperatures of the polymers (A) and preferably near or below the clearing point of the liquid crystal mixtures. Beneficial are $T_g$ values at or below 85° C. The polymers (B) should moreover be soluble in the liquid crystal material above the clearing point without forming residues, if possible. In general, they are non-crosslinked polymers. Further basic requirements do not exist for the polymers (B) so that a wide range of very different materials may be used, for example, poly(meth)acrylate with alkyl groups that comprise more than 2 carbon atoms, cellulose esters or polyvinyl acetals. Polyethyl methacrylate is a well-suited material; likewise cellulose acetates, butyrates or acetate butyrates. The use of polyethylene is precluded however because of immiscibility of this polymer with the other materials of the invention.

It has been found that the size of the formed liquid crystal compartments as a function of the surrounding polymer material can fluctuate slightly. Liquid crystal compartments that are surrounded by soft walls may be somewhat smaller than those that are surrounded by harder walls. In the second embodiment of the invention, in the regions with the softer polymer it is therefore possible that liquid crystal compartments are present that have a lateral expansion of less than 20 μm, for example, of only approximately 10 μm.

It is advantageous, but not mandatory, that the different polymers (A) and (B) at temperatures below the clearing point of the liquid crystal material are incompatible with one another. However, they should all be soluble without residue in the isotropic liquid crystal melt.

As a liquid crystal material all conventional liquid crystal materials or mixtures thereof may be used, for example, nematic, cholesterol-based or other liquid crystal materials. They are available to a person skilled in the art in a large variety.

For producing the layers, the organic polymer material and the liquid crystal material are mixed with one another. The proportion of the polymer material is in general approximately 5 to 30% by weight, preferably 10 to 20% by weight, relative to the sum of polymer and liquid crystal. Since the mechanical strength of the layer to be formed depends for a predetermined polymer proportion inter alia on the glass transition temperature ($T_g$) of the polymer (A), the quantity of the polymer material, in case it has a high $T_g$ value, can be selected optionally to be within a lower range but in case it has a lower $T_g$ value it should be selected to rather have a higher proportion. In the second embodiment of the invention, the proportion of polymer material (B), relative to the sum of the polymers (A) and (B), should be preferably 10 to 40% by weight. Relative to the total mixture of polymer (A), polymer (B), and liquid crystal material it should be preferably approximately 1 to 10% by weight.

The mixture, as needed, may contain a solvent. For producing the layer, the mixture is brought to a temperature that is above the clearing point of the liquid crystal material. When doing so, a homogenous, isotropic mixed melt or solution is formed. Optionally, after removal of the solvent, this mixed melt or solution is enclosed, for example, between two transparent electrically conducting glass panes or polymer films, for which purpose preferably the capillary effect is utilized. Subsequently, the mixed melt is subjected to a controlled cooling process. This causes by means of phase separation the formation of microcellularly structured, polymer-enclosed liquid crystal compartments as described above. By means of the employed cooling regime as well as the composition of the mixed melt, the proportion and the average expansion of the mixed melt can be regulated. A quick cooling action has the effect of forming very fine structures or compartments while a slower cooling action causes larger structures. The only or the last cooling step therefore should not be carried out too fast. It is particularly beneficial to first cause a fast cooling action, to subsequently heat at least for a short period of time to such an extent that the mixed melt becomes homogenous-isotropic, and to subsequently cool so slowly that the desired compartment size is achieved.

As already mentioned above, the liquid crystal compartments of the resulting layer have preferably a lateral expansion that is greater than the thickness of the layer. When the layer, for example, is 2-10 μm, it is therefore desirable that the lateral expansion of the liquid crystal compartments is approximately 10 to 200 μm, preferably 20-100 μm. The thickness of the surrounding polymer walls is preferably 1 to 20 μm.

When cooling, the regions of the polymer material will solidify so that the resulting compartmentalized layer exhibits a high mechanical stability. The regions that are enclosed between the polymer structures that are comprised entirely, substantially, or mainly of the liquid crystal material can be influenced optionally region-selectively, for example, by UV radiation that effects a color change. Since the liquid crystal material cannot or can hardly diffuse through the polymer material into neighboring liquid crystal regions, there is no risk of a later mixing of the influenced regions with non-influenced regions or differently influenced regions.

DESCRIPTION OF PREFERRED EMBODIMENTS

In the following, the invention will be explained in more detail with the aid of examples.

EXAMPLE 1

82.1 g of a liquid crystal mixture that is nematic below a clearing point of 60° C. and that is comprised of 39.0% by weight of 4'-pentyl biphenyl-4-carboxylic acid nitrile, 24.7% by weight of 4'-heptyl biphenyl-4-carboxylic acid nitrile, 13.3% by weight of 4'-octyl biphenyl-4-carboxylic acid nitrile, 9.1 by weight of 1-pentyl-[4,1';4',1"]-terphenyl-4"-carboxylic acid nitrile, 8.6% by weight of 4-butyl benzoic acid-4'-cyanophenylester, 1.7% by weight of 4-pentyl benzoic acid-4'-cyanophenylester, 3.4% by weight of 4-heptyl benzoic acid-4'-cyanophenylester, 0,2% by weight of cholesteryl nonanoate, as well as 17.9 mg of poly(cyclohexyl methacrylate), that has a glass transition temperature of 107° C. and an average molecular mass of 65,000, are dissolved in 2 ml of chloroform. A few drops of this solution are freed of solvents by heating to 110° C. in a small glass cup and transformed into a homogenous mixed melt. With the aid of a heated stainless steel tip a drop of this melt is transferred into a fill opening of a glass display cell that is also heated and whose inner surfaces, provided with ITO, have a spacing of approximately 4 μm. After completion of filling the cell is cooled within a few seconds to room temperature. Subsequently, the cell is heated in a furnace with programmable heating/cooling action to 130° C. and then again cooled wherein cooling from 110° C. to 30° C. is realized at a rate of 1 K/min. The obtained composite layer is comprised of isolated liquid crystal compartments of, on average, 40 μm in diameter that are enclosed by polymer walls of approximately 5 μm in thickness. These walls prevent even at external pressure acting on the cell an irreversible impairment of the electro-optical function as well as a destruction of the compartments and thus an intermixing of neighboring liquid crystal regions.

EXAMPLE 2

In accordance with the method described in Example 1 a glass display cell is filled at 120° C. with a homogeneous-isotropic mixture that is comprised of 20% by weight of poly-(1,2,3,4-tetrahydro-1-naphthyl methacrylate) that has a glass transition temperature of 118° C. and an average molecular weight of 25,000 and that is obtained by radical polymerization of 1,2,3,4-tetrahydro-1-naphthyl methacrylate as well as 80% by weight of nematic liquid crystal mixture ZOC-1002 XX (Chisso Co.) with a clearing point of 79° C. After completion of filling the cell is cooled at a rate of 1.5 K/min to room temperature. The obtained composite layer is similar to that obtained in Example 1. It is comprised of liquid crystal compartments with an average width of approximately 40 μm.

EXAMPLE 3

In accordance with Example 2 a glass display cell is produced with the modification that as a polymer poly-(4-cyclohexylcyclohexyl methacrylate) is used that has a glass transition temperature of 127° C. as well as an average molecular weight of 21,000 and that is produced by radical polymerization of 4-cyclohexylcyclohexyl methacrylate. The obtained composite layer is similar to that obtained in Example 2.

EXAMPLE 4

In accordance with Example 2 a glass display cell is produced with the modification that as a polymer poly-(4-tert-butylcyclohexyl methacrylate) is used that has a glass transition temperature of 155° C. as well as an average molecular weight of 33,000 and that is produced by radical polymerization of 4-tert-butylcyclohexyl methacrylate. The composite layer contains closely arranged liquid crystal compartments with an average width of approximately 15 μm and a thickness of polymer walls of approximately 3 μm.

EXAMPLE 5

In accordance with the method described in Example 1, a PET film display cell is filled at 120° C. with a mixture comprised of 80% by weight of the liquid crystal mixture used in Example 1 as well as 20% by weight of poly-(decahydro-2-naphthyl methacrylate) that has a glass transition temperature of 145° C. and an average molecular weight of 25,000 and that is produced by radical polymerization of decahydro-2-naphthyl methacrylate. The inner surfaces of the display cell are provided with ITO and spaced apart by approximately 4 μm. After completion of filling the cell is cooled at a rate of 1.5 K/min to room temperature. The composite layer comprises closely arranged liquid crystal compartments with an average width of approximately 40 μm and a thickness of the polymer walls of approximately 10 μm.

EXAMPLE 6

A homogeneous isotropic mixture, comprised of 79% by weight of the liquid crystal mixture employed in Example 1 as well as 21% by weight of poly-(cyclohexyl methacrylate-co-isobomyl methacrylate) (0.5:0.5) that has a glass transition temperature of 127° C. and an average molecular weight of 55,000 and that is produced by radical copolymerization of cyclohexyl methacrylate and isobomyl methacrylate serves for filling a glass display cell (4 μm spacing of the ITO surfaces) at 116° C. in accordance with the method disclosed in Example 1. Cooling of the filled cell is realized in the range between +60° C. and +40° C. at a rate of 1.2 K/min; above and below this range at a rate of 2 K/min. The composite layer contains closely arranged liquid crystal compartments with an average width of approximately 50 μm and a thickness of the polymer walls of approximately 10 μm.

EXAMPLE 7

A homogenous isotropic mixture comprised of 76.2% by weight of nematic liquid crystal mixture ZOC-1002 XX (Chisso Co.), 4.8% by weight of chiral doping substance 1.4:3.6 dianhydro-D-sorbite-2.5-di(6-n-hexyloxy-2-naphthoic acid ester) (DE 103 51 364 B4) as well as 19% by weight of poly (cyclohexyl methacrylate) serves at 120° C. in accordance with the method disclosed in Example 1 for filling the glass display cell that has a spacing of the ITO surfaces of approximately 10 μm. The composite layer that is obtained by cooling at a rate of 1.5 K/min contains closely arranged compartments, filled with cholesterol-based liquid crystal material. The obtained display is bistable. By applying 50 V and 50 Hz alternating current pulses the display can be switched from the green reflective planar texture to a transparent focal-conical texture and vice versa.

EXAMPLE 8

A homogenous isotropic mixture contains 79.7% by weight of nematic liquid crystal mixture ZOC-1002 XX (Chisso Co.), 17.2% by weight of poly-(decahydro-2-naphthyl methacrylate) as polymer (A) as well as 3.1% by weight of cellulose acetate butyrate (commercial designation CAB 551-0.01, Eastman) as polymer (B), the latter having a glass transition temperature of 85° C. A portion of this mixture serves for filling a glass display cell at 120° C. in accordance with the method disclosed in Example 1. The spacing of the inner sides of the display glasses provided with ITO is 4 μm. After cooling of the filled cells to room temperature at a rate of 1.2 K/min, a composite layer is obtained that is comprised of aggregations of compartments of a 1st kind enclosed by polymer A having an average width of 50 μm as well as intermediately positioned chains of smaller compartments of a 2nd kind that are formed by intercellular precipitation and have an average width of 10 μm.

EXAMPLE 9

A homogeneous isotropic mixture is comprised of 79.1% by weight of nematic liquid crystal mixture ZOC-1002 XX (Chisso Co.), 18% by weight poly-(decahydro-1-naphthyl methacrylate) as polymer (A) as well as 2.9% by weight poly-(ethyl methacrylate) as polymer (B). The latter has a glass transition temperature of 65° C. With this mixture, in analogy to Example 8, a glass display cell (spacing of the ITO surfaces 4 μm) is filled at 115° C. The composite layer that is obtained after cooling at a rate of 1.2 k/min is comprised of the arrangement disclosed in Example 8 of compartments of the 1st and 2nd kind and their dimension.

What is claimed is:

1. A display cell comprising:
   a first plate and a second plate that are equidistantly spaced from one another, wherein at least the first plate is light-transparent and wherein an intermediate space is formed between the first and second plates;
   an inhomogeneous and anisotropic layer disposed in the intermediate space, the layer comprising a liquid crystal material and an organic polymer material, wherein the layer has first regions that are entirely, substantially or mainly comprised of the liquid crystal material and second regions that are entirely, substantially or mainly comprised of the organic polymer material;
   wherein the first regions are divided into separate compartments and the second regions surround the compartments;
   wherein the organic polymer material is comprised of a first polymer substance and a second polymer substance, wherein the second regions have first areas containing the first polymer substance and second areas containing the second polymer substance;
   wherein the second polymer substance has a glass transition temperature that is lower than a glass transition temperature of the first polymer substance;
   wherein a lateral expansion of the compartments is greater than a thickness of the layer and/or is in a range of 20 μm to 100 μm, wherein, when the compartments are surrounded by the second polymer substance, the lateral expansion is in a range of 10 μm to 100 μm.

2. The display cell according to claim 1, wherein the layer has a thickness of 2 μm to 10 μm.

3. The display cell according to claim 1, wherein the plates have sides that are facing the intermediate space and the sides are provided with an electrically conducting material.

4. The display cell according to claim 1, wherein the first polymer substance comprises an organic polymer with a glass transition temperature of at least 60° C., preferably of at least 80° C., and particularly preferred of at least 100° C., or comprises a mixture of such organic polymers.

5. The display cell according to claim 1, wherein the first polymer substance is comprised of one or several poly(meth)acrylates or contains the one or several poly(meth)acrylates as a main component.

6. The display cell according to claim 5, wherein the one or several poly(meth)acrylates are selected from homopolymers and copolymers or mixtures thereof.

7. The display cell according to claim 5, wherein at least some of the poly(meth)acrylates are selected from polyalkyl methacrylates or polycycloalkyl methacrylates or mixtures thereof.

8. The display cell according to claim 6, wherein the polyalkyl methacrylates and/or polycycloalkyl methacrylates contain condensed and/or bridged cyclic carbon structures and/or branched alkyl groups.

9. The display cell according to claim 1, wherein the second polymer substance has a glass transition temperature that is near or below a clearing point of the liquid crystal material.

10. The display cell according to claim 9, wherein the second polymer substance is selected from polymethacrylates with at least two carbon atoms in the alcohol portion of the ester, cellulose esters, and polyvinyl acetals.

11. The display cell according to claim 9, wherein some of the compartments are surrounded by the first areas of the first polymer substance and some of the compartments are surrounded by the second areas of the second polymer substance.

12. The display cell according to claim 11, wherein the compartments that are surrounded by the second areas of the second polymer substance have a lateral expansion of less than 20 μm.

13. The display cell according to claim 12, wherein the compartments having a diameter of less than 20 μm constitute not more than 70%, preferably not more than 50%, and particularly preferred not more than 30% of all of the compartments of the layer.

14. A mixture comprising:
   a liquid crystal material;
   an organic polymer material that comprises a first polymer substance with a glass transition temperature of at least 60° C. and a second polymer substance with a glass transition temperature that is below the glass transition temperature of the first polymer substance;
   wherein the mixture becomes homogeneous and isotropic upon heating above a clearing point of the liquid crystal material and, upon cooling below the clearing point of the liquid crystal material, separates into first and second regions;

wherein the first regions are comprised entirely, substantially or mainly of the liquid crystal material that is anisotropic, wherein the second regions entirely, substantially or mainly are comprised of the organic polymer material, wherein the organic polymer material is present in a proportion of 5% by weight to 30% by weight, relative to a sum of the liquid crystal material and the organic polymer material.

15. The mixture according to claim 14, wherein the first polymer substance contains a polyacrylate or polymethacrylate, selected from polyalkyl (meth)acrylates as well as polycycloalkyl(meth)acrylates that comprise at least one substituted or unsubstituted cyclic hydrocarbon and/or a branched alkyl group in the alcohol portion of the esters.

16. The mixture according to claim 15, wherein the substituted or unsubstituted cyclic hydrocarbon is a cycloalkane and/or component of a condensed or bridged cyclic system.

17. The mixture according to claim 15, wherein the first polymer substance is selected from homopolymers and copolymers of the polyacrylates and polymethacrylates or from mixtures thereof.

18. The mixture according to claim 14. wherein the clearing point of the liquid crystal material is near or below the glass transition temperature of the organic polymer material.

19. The mixture according to claim 14, wherein the glass transition temperature of the first polymer substance is at least 80° C., preferably at least 100° C.

20. The mixture according to claim 14, wherein the second polymer substance has a glass transition temperature that is near or below the clearing point of the liquid crystal material.

21. The mixture according to claim 20, wherein the second polymer substance is selected from polymethacrylates with at least two carbon atoms in the alcohol portion of the ester, cellulose esters, and polyvinyl acetals.

22. A method for producing a compartmentalized liquid crystal layer in a display cell, comprising:
(a) providing a mixture according to clam 14;
(b) heating the mixture to a temperature above the clearing point of the liquid crystal material;
(c) filling the mixture into a display cell; and
(d) cooling the mixture with a temperature regime that enables separation of the liquid crystal material and the organic polymer material, wherein cooling is carried out so slowly that the first regions of the liquid crystal Material obtain a lateral expansion of 10 μm-100 μm.

23. The method according to claim 22, wherein the glass transition temperature of the second polymer substance of the organic polymer material is near or below the clearing point of the liquid crystal material.

24. The method according to claim 22, wherein cooling is carried out so slowly that the at least 30% of the first regions of the liquid crystal material obtain a lateral expansion of at least 20 μm.

25. The method according to claim 24, wherein cooling is carried out so slowly that at least 50% of the first regions of the liquid crystal material obtain a lateral expansion of at least 20 μm.

* * * * *

UNITED STATES PATENT AND TRADEMARK OFFICE
CERTIFICATE OF CORRECTION

PATENT NO. : 8,330,902 B2  
APPLICATION NO. : 12/668416  
DATED : December 11, 2012  
INVENTOR(S) : Bauer et al.

It is certified that error appears in the above-identified patent and that said Letters Patent is hereby corrected as shown below:

In the specification, column 2, line 34, change "1 pm" to read --1 µm--;

column 5, line 30, change "9.1 by weight" to read --9.1 % by weight--;

column 6, line 51 and line 54, change "isobomyl" to read --isobornyl--;

column 7, line 27, change "Aftercooling of" to read --After cooling of--;

column 10, lines 14/15, change "Material" to read --material--;

column 10, line 21, change "that the at least" to read --that at least--.

Signed and Sealed this  
Twenty-third Day of December, 2014

Michelle K. Lee  
*Deputy Director of the United States Patent and Trademark Office*